United States Patent [19]

Woerlein

[11] Patent Number: 5,208,990

[45] Date of Patent: May 11, 1993

[54] MASONRY LEVEL APPARATUS

[76] Inventor: Oscar J. Woerlein, P.O. Box 954, Woodside, N.Y. 11377

[21] Appl. No.: 859,950

[22] Filed: Mar. 30, 1992

[51] Int. Cl.$^5$ .................................................. G01C 9/00
[52] U.S. Cl. .......................................... 33/354; 33/404;
 33/518; 33/379; 33/382
[58] Field of Search .................. 33/404, 350, 354, 370,
 33/371, 379, 381, 382, 518; 7/164, 143

[56] References Cited

U.S. PATENT DOCUMENTS

| 1,089,571 | 3/1914 | McNutt | 33/370 |
| 1,200,410 | 10/1916 | Chemrinsky | 33/381 |
| 2,307,892 | 1/1943 | Lowther | 33/382 |
| 2,998,655 | 9/1961 | White | 33/382 |
| 4,574,491 | 3/1986 | Vining | 33/379 |
| 5,046,387 | 9/1991 | Levake | 33/379 |

FOREIGN PATENT DOCUMENTS 14139 5/1902 Sweden ................................ 33/379

OTHER PUBLICATIONS

Miehle, "Shopmade Level Aligns Radial Holes", Popular Science, Nov. 1945, p. 177.

Primary Examiner—William A. Cuchlinski, Jr.
Assistant Examiner—Alvin Wirthlin
Attorney, Agent, or Firm—Leon Gilden

[57] ABSTRACT

A masonry level is arranged and configured as an elongate plate, including a planar top surface spaced from and parallel to a planar bottom surface, wherein a U-shaped handle is mounted medially of the top surface extending orthogonally and upwardly thereof having a first spirit level positioned within the handle to the top surface, with second and third spirit levels orthogonally oriented relative to the first spirit level and parallel relative to one another arranged to provide for a planar top surface in the leveling of masonry block and brick. A modification of the invention includes impact structure arranged to enhance ease of manipulation of underlying masonry workpieces.

3 Claims, 4 Drawing Sheets

MASONRY LEVEL APPARATUS

BACKGROUND OF THE INVENTION

1. Field of the Invention

The field of invention relates to masonry apparatus, and more particularly pertains to a new and improved masonry level apparatus wherein the same is arranged for utilization in the leveling of masonry structure.

2. Description of the Prior Art

Levels of various types have been utilized in the prior art but in the application to masonry, an elongate planar surface arranged to accommodate masonry workpieces therebelow has had limited application, particularly in use in masonry construction. Prior art level structure is exemplified by U.S. Pat. No. 3,921,306 to Provi setting forth a prior art carpentry and masonry level of conventional construction.

U.S. Pat. No. 4,910,876 to Channell, as well as the U.S. Pat. No. 4,563,822, set forth further examples of masonry-type level structure addressed in the prior art, but failing to provide for the planar alignment and impact surface of the instant invention.

Accordingly, it may be appreciated that there continues to be a need for a new and improved masonry level apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of level apparatus now present in the prior art, the present invention provides a masonry level apparatus wherein the same is arranged to provide for an elongate planar bottom surface for leveling and impacting of masonry workpieces therebelow. As such, the general purpose of the present invention, which will be described subsequently in greater detail, is to provide a new and improved masonry level apparatus which has all the advantages of the prior art level apparatus and none of the disadvantages.

To attain this, the present invention provides a masonry level arranged and configured as an elongate plate, including a planar top surface spaced from and parallel to a planar bottom surface, wherein a U-shaped handle is mounted medially of the top surface extending orthogonally and upwardly thereof having a first spirit level positioned within the handle to the top surface, with the second and third spirit levels orthogonally oriented relative to the first spirit level and parallel relative to one another arranged to provide for a planar top surface in the leveling of masonry block and brick. A modification of the invention includes impact structure arranged to enhance ease of manipulation of underlying masonry workpieces.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved masonry level apparatus which has all the advantages of the prior art level apparatus and none of the disadvantages.

It is another object of the present invention to provide a new and improved masonry level apparatus which may be easily and efficiently manufactured and marketed.

It is a further object of the present invention to provide a new and improved masonry level apparatus which is of a durable and reliable construction.

An even further object of the present invention is to provide a new and improved masonry level apparatus which is susceptible of a low cost of manufacture with regard to both materials and labor, and which accordingly is then susceptible of low prices of sale to the consuming public, thereby making such masonry level apparatus economically available to the buying public.

Still yet another object of the present invention is to provide a new and improved masonry level apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
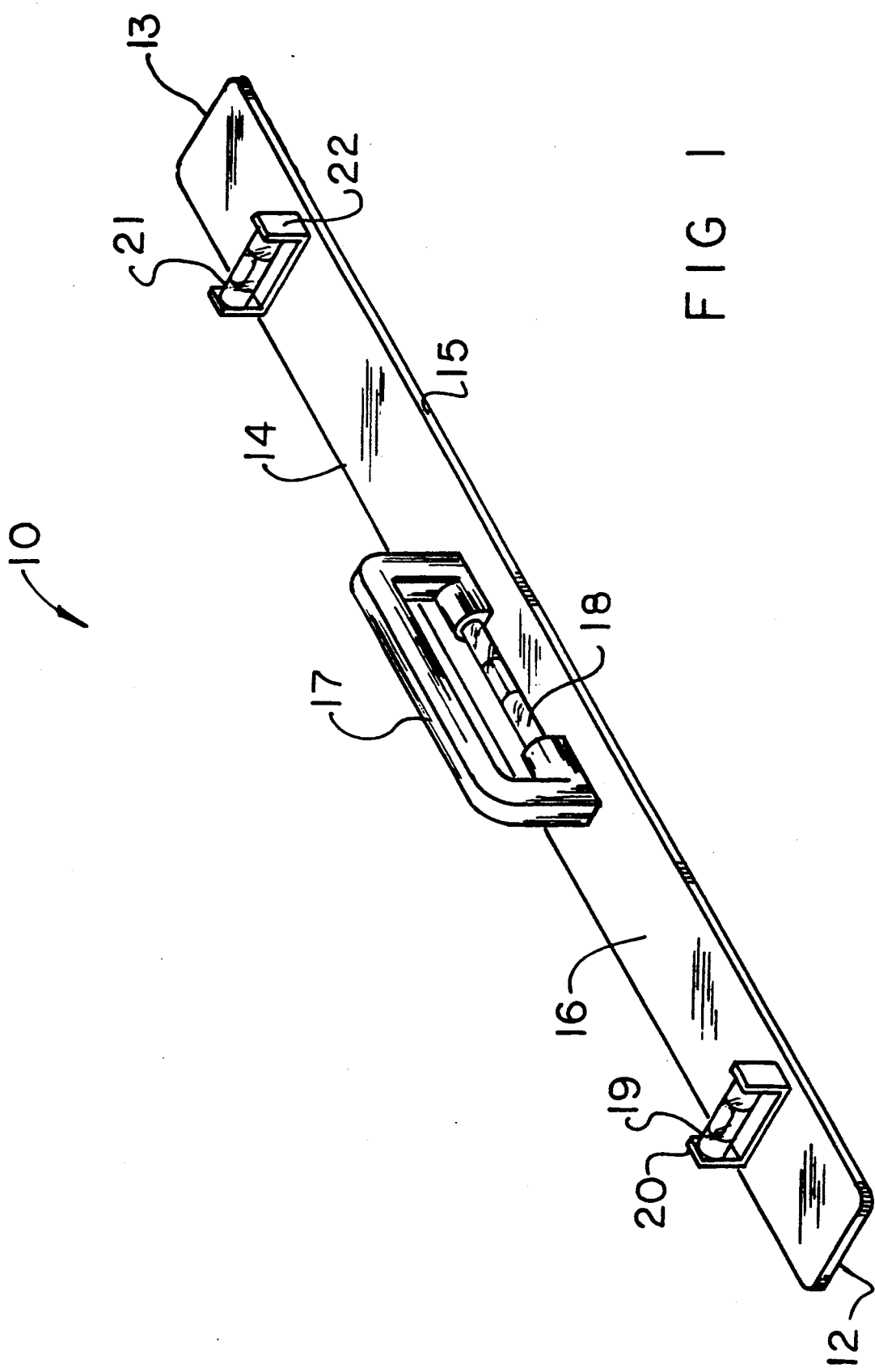
FIG. 1 is an isometric illustration of the instant invention.

With reference now to the drawings, and in particular to FIGS. 1 to 4 thereof, a new and improved masonry level apparatus embodying the principles and concepts of the present invention and generally designated by the reference numerals 10, 10a, and 10b will be described.

More specifically, the masonry level apparatus 10 of the instant invention essentially comprises an elongate plate member of a generally rectilinear configuration, including a first end edge 12 spaced from, parallel to, and coextensive with a second end edge 13. Respective first and second side edges 14 and 15 orthogonally oriented relative to the end edges 12 and 13 are arranged in a parallel, spaced, and coextensive relationship relative to one another to define a rectilinear configuration, with the first and second side edges of a second length substantially greater than a first length of the first and second end edges. A top surface 16 of the plate member is of a planar configuration coextensive with and parallel to a planar bottom surface. A handle loop 17 is orthogonally and fixedly mounted medially of the top surface orthogonally oriented between the first and second end edges 12 and 13. A first spirit level tube 18 oriented parallel relative to the first and second side edges 14 and 15 and medially therebetween is positioned below the handle loop 17 between legs of the U-shaped handle loop 17 to afford protection to the spirit level during use. Second and third respective spirit level tubes 19 and 21 are arranged orthogonally relative to the first and second side edges 14 and 15 positioned adjacent the respective first and second edges 12 and 13. A second spirit level U-shaped support 20 and a third spirit level U-shaped support 22 secure the spirit levels therewithin while affording protection to the spirit levels during use to minimize impact of the spirit level tubes and effecting their subsequent damage.

Figure 2:
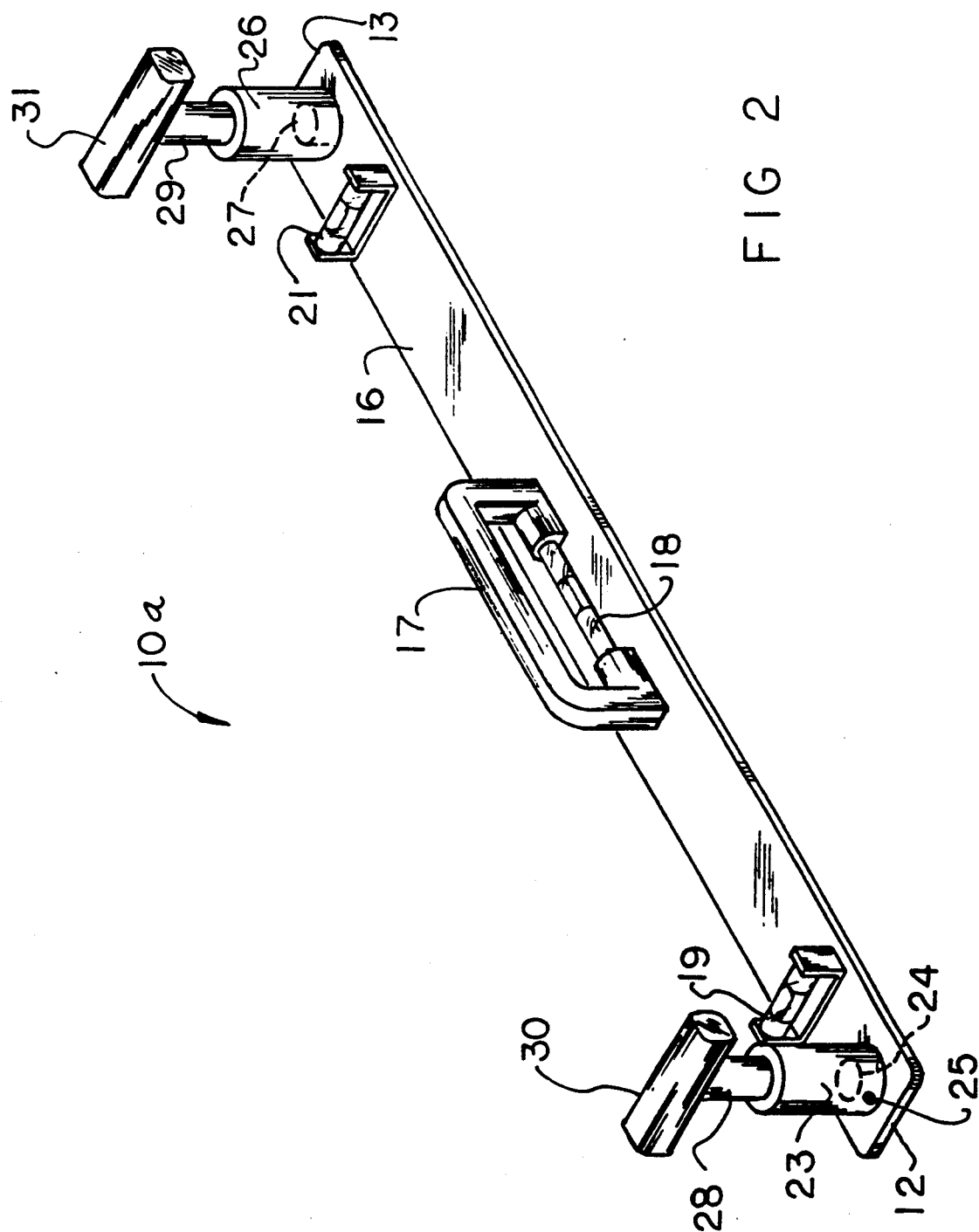
FIG. 2 is an isometric illustration of a modification of the invention.
Figure 4:
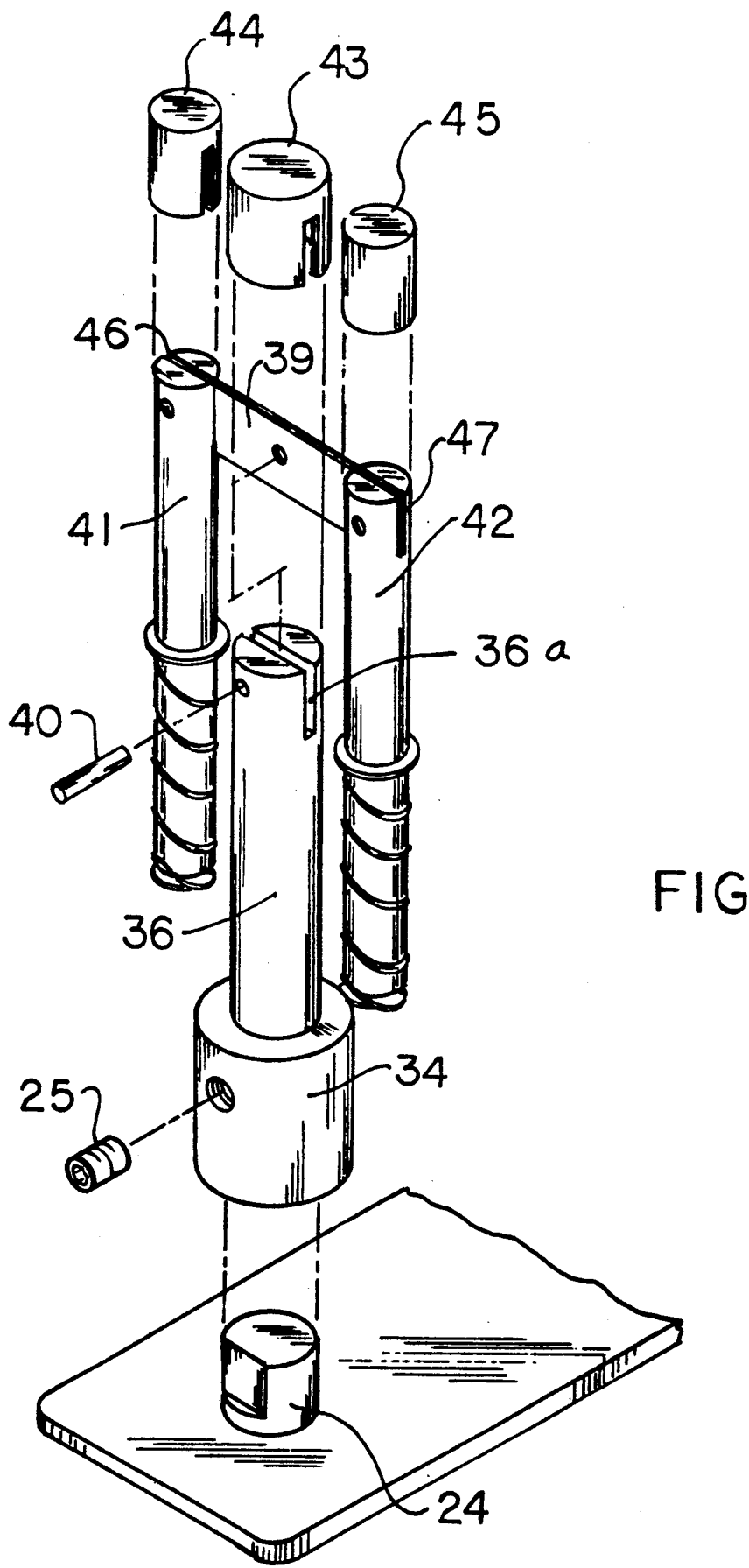
FIG. 4 is an isometric enlarged illustration of the impact structure of FIG. 3.

FIG. 2 and the apparatus 10a includes, in addition to the structure 10 of FIG. 1, a respective first and second slide cylinder 23 and 26 mounted to respective first and second support bosses 24 and 27, of a type as illustrated in FIG. 4. The slide cylinders 23 and 26 each include lock screws 25 directed radially through each respective slide cylinder to secure each slide cylinder to an associated support boss. The first slide cylinder 23 and the second slide cylinder 26 include respective first and second impact rods 28 and 29 slidably received within the slide cylinders coaxially aligned and above the associated support bossed, whereupon impacting of respective first and second handles 30 and 31 orthogonally mounted to an upper distal end of the respective first and second impact rods 20 and 29 effects impact to the plate member adjacent the first and second end edges 12 and 13 for alignment of underlying workpieces.

Figure 3:
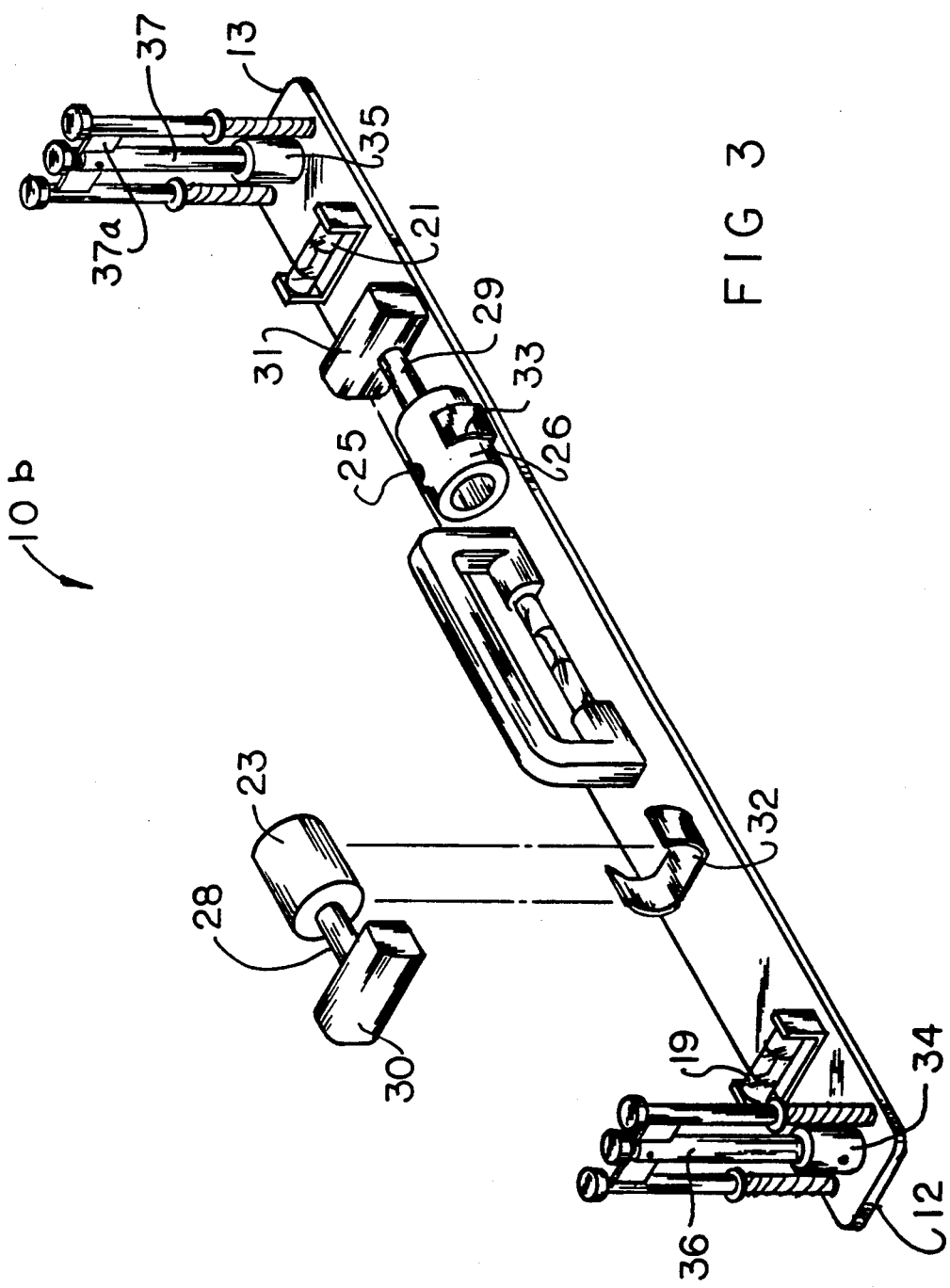
FIG. 3 is an isometric illustration of a further modification of the invention.

The organization 10b, as set forth in FIGS. 3 and 4, additionally includes respective first and second C-shaped spring clips 32 and 33 to mount and secure the associated first and second slide cylinders 23 and 26. In this manner, secured to the respective first and second support bosses 24 and 27 are the respective third and fourth slide cylinders 34 and 35 utilizing fasteners 25 to secure the slide cylinders, in a manner as described above. The third and fourth slide cylinders 34 and 35 include respective third and fourth slide cylinder rods 36 and 37, each including a respective third rod slot 36a and fourth rod slot 37a at their upper distal ends to pivotally receive a respective pivot bar 39 therewithin mounted within each slot by a pivot bar axle 40, in a manner as illustrated in FIG. 4. Respective first and second side impact rods 41 and 42 are pivotally mounted to opposed first and second end portions of the pivot bar 39, with the impact rods orthogonally oriented relative to the top surface 16 of the plate member to permit impacting of the top surface adjacent the side edges 14 and 15, as required to the more precise alignment of the plate member relative to an underlying workpiece. A slide rod cap 43 is mounted to a top surface of the third and fourth slide cylinder rods 36 and 37, with associated first and second impact rod caps 44 and 45 mounted to a top of the first and second side impact rods 41 and 42 to afford a greater surface for receiving impacting of a hammer thereon. Each of the rod caps are formed with a slotted side wall to accommodate the pivot bar 39, in a manner as illustrated in FIG. 4. The pivot bar 39 is further received within the respective first and second impact rod slots 46 and 47 to align the impact rods relative to the side edges of the plate member 11 for use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A masonry level apparatus, comprising,
    an elongate plate member, the plate member including a planar top surface spaced from and parallel to a planar bottom surface in a coextensive relationship, wherein the plate member further includes a first elongate side edge spaced from, parallel to, and coextensive with a second side edge, and
    a first end edge spaced from, parallel to, and coextensive with a second end edge, wherein the first end edge and the second end edge are orthogonally oriented relative to the first side edge and the second side edge extending therebetween, and
    a U-shaped handle loop fixedly mounted medially of the top surface extending orthogonally thereto, wherein the handle loop is oriented parallel and medially between the first side edge and the second side edge, and
    a first spirit level tube mounted below the handle loop, wherein the handle loop includes spaced parallel handle loop legs and the first spirit level tube is positioned between the handle loop legs, and a second spirit level tube mounted to the top surface parallel to and adjacent the first end edge, and a third spirit level tube fixedly mounted to the top surface parallel to and adjacent the second end edge, and the second spirit level tube includes a second spirit level tube U-shaped support receiving the second spirit level tube therewithin, and the third spirit level tube includes a third spirit level tube U-shaped support fixedly receiving the third spirit tube therewithin to afford protection to the second spirit level tube and the third spirit level tube respectively, and a first support boss orthogonally mounted to the top surface between the first end edge and the second spirit level tube, and a second support boss orthogonally mounted to the top surface between the third spirit level tube and the second end edge, and the first support boss accommodating a first slide cylinder thereon, and the second support boss accommodating a second slide cylinder thereon, the first slide cylinder including a first impact rod slidably mounted within the first slide cylinder coaxially aligned with the first support boss, and the second slide cylinder including a second impact rod aligned relative to the second slide cylinder and the second support boss, and the first impact rod including a first handle orthogonally mounted to an upper distal end of the first impact rod, and the second impact rod including a second handle orthogonally mounted to an upper distal end of the second impact rod.

2. An apparatus as set forth in claim 1 including a first C-shaped spring clip fixedly mounted to the top surface between the handle and the second spirit level tube to selectively receive the first slide cylinder therewithin for storage thereof, and a second C-shaped spring clip fixedly mounted to the top surface between the U-shaped handle and the third spirit level tube to selectively receive the second slide cylinder for storage thereof.

3. An apparatus as set forth in claim 2 including a third slide cylinder selectively securable to the first support boss, and a fourth slide cylinder selectively securable to the second support boss, the third and fourth slide cylinders include respective third and fourth slide cylinder rods slidably mounted coaxially relative to the third and fourth slide cylinders, the third slide cylinder rod includes a third slide cylinder rod slot formed at an upper distal end of the third slide cylinder rod, and the fourth slide cylinder rod includes a fourth slide cylinder rod slot formed at an upper distal end of the fourth slide cylinder rod, and each of the third and fourth slide cylinder rod slots include a pivot bar pivotally mounted therewithin, with each pivot bar including a respective first and second side impact rod orthogonally oriented relative to the top surface pivotally mounted at opposed ends of the pivot bar.

* * * * *